United States Patent [19]

Berger

[11] 4,044,868

[45] Aug. 30, 1977

[54] SLIPPING COUPLING FOR A RECORDING AND/OR PLAYBACK APPARATUS

[75] Inventor: Erich Berger, Vienna, Austria

[73] Assignee: U.S. Philips Corporation, New York, N.Y.

[21] Appl. No.: 639,358

[22] Filed: Dec. 10, 1975

[30] Foreign Application Priority Data

Dec. 16, 1974 Austria .............................. 10034/74

[51] Int. Cl.² .............................................. F16D 67/02
[52] U.S. Cl. .................. 192/12 B; 64/30 R; 192/110 B; 188/71.2; 192/41 A
[58] Field of Search ................... 192/110 B, 98, 12 B; 188/71.2

[56] References Cited

U.S. PATENT DOCUMENTS

| 2,555,929 | 6/1951 | Jensen et al. | 192/104 |
| 2,876,882 | 3/1959 | Kelleigh | 192/98 |
| 3,277,988 | 10/1966 | Pitner | 192/110 B X |
| 3,625,327 | 12/1971 | Birdsey | 192/110 B |

Primary Examiner—Benjamin W. Wyche
Attorney, Agent, or Firm—Frank R. Trifari; David R. Treacy

[57] ABSTRACT

A slipping clutch which comprises a first sliping clutch section and, coaxial therewith, a second slipping clutch section pivotably journalled to a counter-bearing. An annular bearing part is coaxial with the second slipping clutch section so as to allow said section to pivot freely. This part comprises two 90° offset pairs of bearing points, the bearing points of each pair being diametrically opposed, one pair engaging the second slipping clutch section and the other pair engaging the counter-bearing.

5 Claims, 4 Drawing Figures

SLIPPING COUPLING FOR A RECORDING AND/OR PLAYBACK APPARATUS

The invention relates to a slipping clutch useful, for example for a recording and/or playback apparatus, which comprises a first slipping clutch section which is rotatable about a spindle and, coaxial therewith, a second slipping clutch section which is pivotably journalled on a counter-bearing and adapted to cooperate with drive and/or braking means. In such a slipping clutch the pivotable bearing of the second slipping clutch section should ensure that the two slipping clutch sections always engage uniformly and snugly and thus that a constant driving torque of these sections is obtained. This is very important for slipping clutches which are provided for drive and/or braking means for the record carrier of recording and/or playback apparatus, as otherwise the uniform transport of the record carrier is adversely affected. As is known the uniform transport of the record carrier in recording and/or playback apparatus for video signals and also for audio signals should comply with very stringent requirements in order to guarantee a high recording and reproduction quality of this equipment.

In a known slipping clutch a ball-and-socket bearing is provided for pivotably journalling the second slipping clutch section. Such a ball-and-socket bearing, which is difficult to manufacture, exhibits comparatively high friction between the socket cap and its counter-bearing, so that the movability of the second slipping clutch section is still affected and the object which is pursued cannot be attained in an entirely satisfactory manner.

It is an object of the invention to provide a slipping clutch of the type mentioned in the preamble, which in a simple manner always ensures a uniform engagement of the two slipping clutch sections.

In accordance with the invention a coaxially disposed annular bearing part is provided, which comprises two first diametrically opposed bearing points which project in one direction of the spindle, and which engage the second slipping clutch section, and two second diametrically opposed bearing points which project in a direction opposite to that of the first bearing points, are 90° offset relative to said first bearing points and engage the counter-bearing. Thus, the second slipping clutch section is journalled completely free from misaligning forces, in accordance with the principle of a Cardan suspension, so that it always smoothly engages with the first slipping clutch section without being influenced by unwanted friction in a uniform and snug manner. This ensures that, as previously stated, a constant driving torque is obtained and any disturbing influence of the slipping clutch on the uniform transport of the record carrier is avoided.

In an advantageous further embodiment of the slipping clutch according to the invention at least one pair of the two first and two second bearing points take the form of a plain bearing. As a result, a continuous relative movement between the second slipping clutch section and the counter bearing is possible, so that the slipping clutch may also be used as a braking means for the first slipping clutch section, the second slipping clutch section then being retained.

The bearing points may for example take the form of balls or rollers which are accommodated in the annular bearing part. However, it has been found to be advantageous that the bearing points take the form of projections formed on the annular bearing part, since in this manner a particularly simple bearing part is obtained, which can also be manufactured cheaply, for example from a plastic. In this respect it is also found to be particularly advantageous that the annular bearing part takes the form of a disk in which radially extending corrugations are formed as bearing points. Thus, a bearing part is realized which has only a very small thickness, which is very advantageous with respect to the space required for the complete slipping clutch, while the bearing points can again be manufactured very simply. Such a bearing part may for example consist of a part of a sheet material in which the corrugations are pressed.

The invention will be described in more detail with reference to two embodiments shown in the drawing, but to which the invention is not limited.

Figure 1:
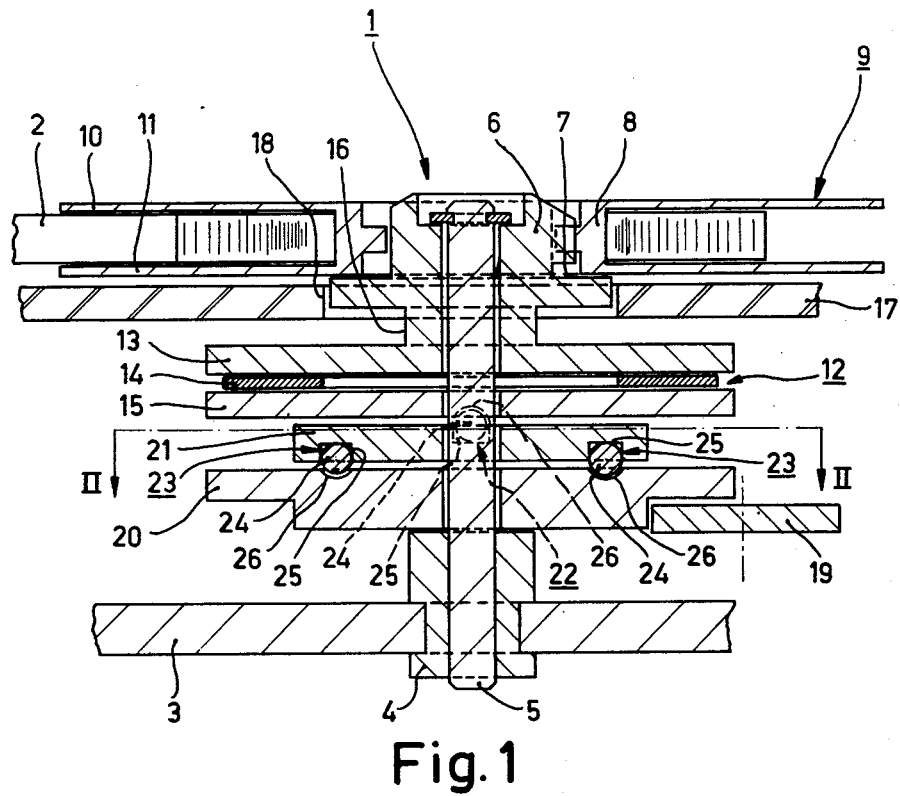
FIG. 1 shows an axial cross-section of a winding device with a slipping clutch, whose bearing part for the second slipping clutch section comprises bearing points formed by balls.

FIG. 1 shows a drivable winding device 1 for a record carrier 2 in the form of a tape of a recording and/or playback apparatus. On a chassis plate 3 of the apparatus a stationary spindle 5 is pressed into a bush 4. A winding mandrel 6 of the winding device 1 is rotatably journalled on the spindle 5, on which mandrel a winding hub 8 can be positioned so as to be driven, which hub bears on a supporting surface 7 of the winding device 1 which surface is connected to the winding mandrel 6. The winding hub 8 is provided with two flanges 10 and 11 so as to form a reel, between which flanges the record carrier 2 is wound on the winding hub 8.

Furthermore the winding device 1 comprises a slipping clutch 12, which is coaxial relative to the spindle and which in known manner comprises a first slipping clutch section 13 and a second slipping clutch section 15 which is provided with a first friction disk 14, which consists of felt, a flocked plastic, or the like. The first slipping clutch section 13 is connected to the winding mandrel 6 by means of a connecting sleeve 16 through an opening 18 formed in a covering plate 17 of the apparatus. Bearing of the second slipping clutch section 15 is effected with a circular supporting plate 20, which is rotatable about the spindle 5 and which bears on the sleeve 4, which plate can be driven by drive means which are symbolically represented by a friction wheel 19. On the supporting plate 20, which serves as a counter-bearing, the second slipping clutch section 15 is pivotably journalled, so as to enable it to be adapted to the first slipping clutch section 13 with its friction disk 14.

Figure 2:
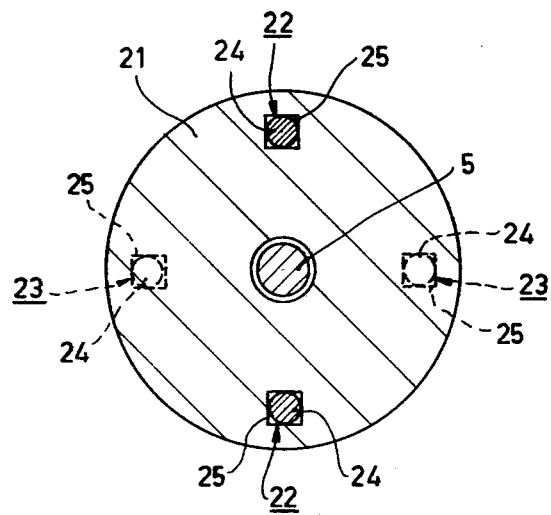
FIG. 2 shows a cross-section through said winding device in accordance with the line II—II in FIG. 1.

For pivotably journalling the second slipping clutch section 15 an annular bearing part 21 is provided which is coaxial with the spindle 5, which part is shown in cross-section in FIG. 2. This bearing part 21 has two first diametrically opposed bearing points 22 which project in the direction of the spindle 5 towards the second slipping clutch section 15 and which co-operate with said section 15, and two second diametrically opposed bearing points 23, which project in a direction opposite to that of the first bearing points, which are 90° offset relative to said first bearing points, and which cooperate with the supporting plate 20 which functions as a counter-bearing. Thus, a Cardanic suspension is formed for the second slipping clutch section, so that said section is free from pivotal forces. In this case, the bearing points 22, 23 are constituted by balls 24, which are retained in cages 25 in the bearing part 21, the balls 24 being contained in bearing sockets 26 provided in the second slipping clutch section 15 and in the supporting plate 20, and thus establishing a non-positive connection between the supporting plate 20 and the second slipping clutch section 15. In fact, said non-positive connection may alternatively be formed directly between the driven supporting plate and the second slipping clutch section, but then care is to be taken that the pivotable bearing of the second slipping clutch section is not impaired thereby.

When the winding device 1 is used for winding a record carrier 2 which is advanced with a uniform constant speed of transport, the supporting plate 20 is driven with such a speed that a specific slip occurs between the two slipping clutch sections 13, 15, so that the record carrier is perfectly wound independent of the instantaneous diameter of the reel. In this respect it is then very essential, as is known, that the two slipping clutch sections 13, 15 during their rotary movement always remain in uniform and snug engagement, because otherwise owing to an irregulary operating slipping clutch the uniform transport of the record carrier might be impaired. In the case of a slipping clutch, of which the second slipping clutch section is not pivotable, an irregular cooperation of the slipping clutch sections may be caused by for example irregular movements of one of the slipping clutch sections owing to bearing tolerances of the slipping clutch sections or a difference in thickness of the friction disks, in which case minor deviations from the nominal value may have a disturbing effect.

By designing the pivotable bearing for the second slipping clutch section 15 as described hereinbefore, a uniform snug engagement of said section with the first slipping clutch section is always obtained in a particularly satisfactory manner, since owing to this construction the second slipping clutch section is journalled entirely free from faces in accordance with the Cardan principle and consequently its movability, in view of the adaptation to the first slipping clutch section, is substantially not limited. Thus, even the smallest disturbing influences will have no effect on the constant snug engagement of the two slipping clutch sections, so that by means of such a winding device a highly uniform transport of the record carrier can be achieved.

Figure 3:
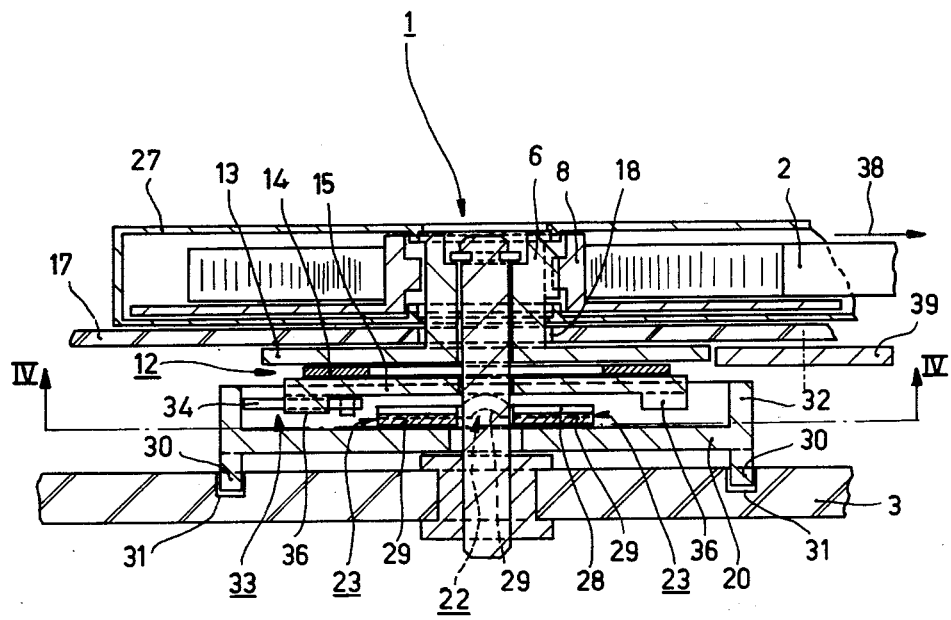
FIG. 3 shows an axial cross-section through a winding device with a slipping clutch, which takes the form of a disengageable braking means for the winding device, an annular disk provided with corrugations being used as bearing part for the second slipping clutch section.

In the embodiment of FIG. 3 the record carrier 2 which is wound onto the winding hub 8 is accommodated in a cassette 27 which can be positioned on the covering plate 17 of the apparatus, the winding mandrel 6 of the winding device 1 entering to operative engagement with the winding hub 8 upon insertion of the cassette. When the record carrier 2 is unwound from the winding hub 8 the slipping clutch 12 of the winding device 1 acts as a brake, in order to obtain a specific tension in the unwinding record carrier 2. When the winding device is employed for winding the record carrier 2 onto the winding hub 8, this braking action can be eliminated as will be explained hereinafter.

The winding device 1 with the slipping clutch 12 is essentially of a construction similar to that in accordance with FIG. 1. However, in this case an annular disk 28 is provided for pivotably journalling the second slipping clutch section 15, in which disk radially extending corrugations 29 are pressed as first bearing points 22 and as second bearing points 23. The second slipping clutch section 15 is then disposed on the first pair of bearing points 22, whilst the second pair of bearing points 23 bears on a flat surface of the supporting plate 20. Thus, particularly the bearing points 23 constitute a plain bearing, in order to allow a relative movement between the disk 28, which serves as the bearing part for the second slipping clutch section 15, and the supporting plate 20, which will be described in more detail hereinafter.

The disk shape of the bearing part results in a particularly compact construction. This bearing part may simply consist of a sheet material part, which is obtained by simple blanking, the corrugations being formed by means of a pressing operation which is combined with the blanking operation. It is evident that it would alternatively be possible to make the bearing component of a plastic; furhermore integral projections such as bosses, points, ridges etc. may be provided as bearing points. Such a bearing part again ensures that the second slipping clutch section is free from pivotal forces, so that always a uniform engagement between said section and the first slipping clutch section is guaranteed.

Figure 4:
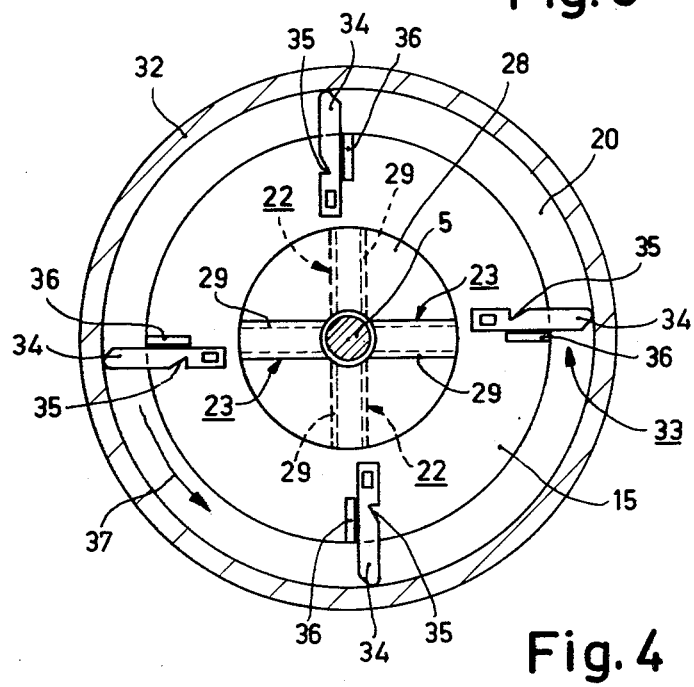
FIG. 4 is a cross-section through said winding device in accordance with the line IV—IV in FIG. 3.

In the present example the circular supporting plate 20 is locked against a rotary movement about the spindle 5 by means of two projections 30, which extend into corresponding recesses 31 in the chassis plate 3. Furthermore the supporting plate 20 comprises a cylindrical annular projection 32 at its lateral surface which is remote from the chassis plate 3. Between this projection 32 of the supporting plate 20 and the pivotable second slipping clutch section 15 a braking means 33 is provided, which is dependent on the direction of rotation, which means is constituted by four essentially radially extending rubber rods 34 which are secured to the second slipping clutch section 15 and which engage the stop 32 with their free ends. Each rubber rod 34, as can be seen in FIG. 4, has a notch 35 at one side, whilst along the other side a support 36 for the rubber rod 34 on the second slipping clutch section 15 is provided.

The method of operation of this braking means 33 is as follows. A rotary movement of the second slipping clutch section 15 in a direction indicated by the arrow 37 in FIG. 4 is prevented, namely in that the rubber rods 34 engage with their supports 36 and with their free ends establish a non-positive connection with the projection 32 of the stationary supporting plate 20 through a clamping action, whereas in the case of an opposite rotary movement of the second slipping clutch section 15 the rubber rods 34 bend at their notches 35, so that the free ends of the rubber rods 34 cannot form a clamping connection with the projection 32 of the stationary supporting plate 20, the non-positive connection with the projection 32 thus being released.

When the record carrier is unwound from the winding hub 8 in the direction indicated by the arrow 38, the first slipping clutch section 13, which is in operative connection with the winding hub 8, is rotated, which section via the friction disk 14 of the second slipping clutch section 15 tends to drive said second slipping clutch section. However, the braking means 33, as described hereinbefore, prevents the second slipping clutch section 15 from being rotated, so that this section via its friction disk 14 exerts a braking action on the first slipping clutch section 13 and thus, via the winding mandrel 6 connected to it on the record carrier 2 to be unwound, as a result of which a certain tension of the record carrier is obtained.

Owing to the construction described for the bearing and the second slipping clutch section it is again ensured that the second slipping clutch section is free from pivotal forces and that consequently the two slipping clutch sections continually engage and co-operate uniformly and snugly, so that the braking action on the record carrier is also uniform and without disturbances, thus again ensuring uniform transport of the record carrier. The rubber rods, which constitute the braking means and which are connected to the second slipping clutch section, do not affect the readily pivotable second slipping clutch section owing to their flexibility in the axial direction.

In order to enable the record carrier to be rewound onto the winding hub 8 in a direction opposite to that of the arrow 38, for which a uniform transport of said record carrier is no longer essential, the first slipping clutch section 13 can be driven directly by drive means which are symbolically represented by a friction wheel 39. The braking device 33 is then released as described, so that the second slipping clutch section 15 can then rotate freely along with the first slipping clutch section 13, and conequently the previously mentioned braking action is eliminated during rewinding. The corrugations 29 on the bearing part 28 then, in contradistinction to the bearing points obtained by the non-positive engagement of the balls 24 in the bearing sockets 26, constitute plain bearings in accordance with the example of FIGS. 1 and 2, so that between the second slipping clutch section 15 and the supporting plate 20 which acts as counter bearing, a relative movement is possible.

As appears from the above, a number of modifications of the embodiments described are possible without departing from the scope of the invention. In this respect it is to be noted that a slipping clutch according to the invention need not necessarily be coaxial with the winding mandrel, but might for example also be combined with a friction wheel which cooperates with the winding device; similarly, other applications of such a slipping clutch such as drive systems for the record carrier of a recording and/or playback apparatus are possible.

What is claimed is:

1. A slipping clutch comprising a spindle, a first slipping clutch section rotatable about the spindle, a second slipping clutch section coaxial with the first section and rotatable about the spindle, a counter-bearing, means for controlling rotation of the counter-bearing, and an annular bearing part mounted coaxially with said slipping clutch sections, having a pair of first diametrically opposed bearing points which project in one direction of the spindle and engage the second section and having a pair of second bearing points which project in a direction opposite said first points, 90° offset with respect to said first point, and engage the counter-bearing, at least one of said pairs being formed as plain bearings for withstanding continuous rotation between said part and the surface engaged by said at least one pair.

2. A clutch as claimed in claim 1 wherein said bearing points are formed by axial projections on the annular part.

3. A clutch as claimed in claim 2 wherein said means for controlling rotation restrains said counter-bearing against rotation and said clutch further comprises disengageable braking means for preventing rotation of said second slipping clutch section with respect to said counter-bearing.

4. A clutch as claimed in claim 3 wherein said disengageable braking means comprises means for preventing one direction of relative rotation only.

5. A clutch as claimed in claim 2 wherein said projections are formed by radially extending corrugations pressed into the annular bearing part.

* * * * *